United States Patent [19]

Armand et al.

[11] Patent Number: 4,579,793

[45] Date of Patent: Apr. 1, 1986

[54] MACROMOLECULAR MATERIAL DISPLAYING IONIC CONDUCTION, AND PROCESS FOR MANUFACTURING SAME

[75] Inventors: Michel Armand, Echirolles; Daniel Muller, Pau, both of France

[73] Assignee: Societe Nationale Elf Aquitaine, Courbevoie, France

[21] Appl. No.: 687,902

[22] Filed: Dec. 31, 1984

[30] Foreign Application Priority Data

Jan. 2, 1984 [FR] France .................. 84 00006

[51] Int. Cl.⁴ .................. H01M 6/18; H01M 10/40
[52] U.S. Cl. .................. 429/192; 252/62.2
[58] Field of Search .......... 429/192; 252/62.2, 182.1

[56] References Cited

U.S. PATENT DOCUMENTS

| | | | |
|---|---|---|---|
| 4,303,748 | 12/1981 | Armand et al. | 429/192 |
| 4,357,401 | 11/1982 | Andre et al. | 429/192 |
| 4,505,997 | 3/1985 | Armand et al. | 429/192 |

FOREIGN PATENT DOCUMENTS

| | | | |
|---|---|---|---|
| 78505 | 5/1983 | European Pat. Off. | 429/192 |
| 2442513 | 7/1980 | France | 429/192 |
| 2493609 | 5/1982 | France | 429/192 |
| WO83/03322 | 5/1983 | PCT Int'l Appl. | 429/192 |

*Primary Examiner*—Donald L. Walton
*Attorney, Agent, or Firm*—Oblon, Fisher, Spivak, McClelland & Maier

[57] ABSTRACT

A macromolecular material displaying ionic conduction, comprised of a salt in solution in an organometallic polymer. The organometallic polymer comprises an organic polymer in which a metal atom is directly connected by the intermediacy of an oxygen atom to at least two of the organic polymer chains. The material is applied in the production of electrochemical generators.

18 Claims, No Drawings

MACROMOLECULAR MATERIAL DISPLAYING IONIC CONDUCTION, AND PROCESS FOR MANUFACTURING SAME

BACKGROUND OF THE INVENTION

1. Field of the Invention

The invention relates to a novel macromolecular material displaying ionic conduction, which may be used as a solid electrolyte in an electrochemical generator.

2. Description of the Prior Art

The present invention relates to macromolecular materials displaying ionic conduction. These materials are non-crystalline at ambient temperature or sufficiently non-crystalline so that they may be employed in electrochemical generators of electricity (either primary or secondary) operating at ambient temperature.

According to the prior art, solid electrolytes are known which are comprised of solid solutions of ionic compounds in polymers. An example which may be cited can be found in European Patent Publication No. 0 013 199, entitled "Electrochemical Current Generators, and Novel Materials for Producing Such Generators." This application in particular describes solid solutions of lithium salts in aprotic polar polymers in which the polymers solvate the lithium ion. Among the polymers mentioned in said European Patent Publication are polyoxyethylene compounds, polyoxypropylene compounds, and copolymers of these with other monomers.

In order to improve the mechanical properties of the electrolytes comprised of these substances and to improve their behavior with respect to crystallization, it has been proposed to employ a complex crosslinked elastomer material as an electrolyte (French Patent Publication No. 2 485 274 (U.S. Pat. No. 4,357,401), "Solid Electrolyte Based on a Macromolecular Material Displaying Ionic Conduction"). Crosslinking is effected by use of polymeric materials having crosslinkable functionalities employing the usual techniques. According to French Patent Publication No. 2 485 274, the most usual functionalities are isocyanate groups which lead to the formation of urethane linkages. Such resins however, have the disadvantage that they can react with the metal of the anode and thus cause degradation of the polymer resulting in loss of its elastomeric pliancy. Reaction with the anode can also result, via irreversible oxidation, in consumption of a portion of the anode metal.

According to French Patent Publication No. 2 493 609, "Solid Macromolecular Electrolyte for a Lithium Electrochemical Generator", the solid electrolyte comprises as the solvated salt a polyester-type elastomeric copolymer produced by the polycondensation of dimethylterephthalate with a polyglycol and a diol. That Application mentions polybutylene glycol, polyethylene glycol, and polypropylene glycol as suitable glycols. However, those polymers suffer similar drawbacks to the French Patent Publication No. 2 485 274 since the condensates include ester functions, which also have a tendency to react with the metal of the anode and thereby degrade the polymer.

In addition, according to these two cited methods it is necessary to use stoichiometric quantities of the condensing or crosslinking agent for the intended reactions to follow their proper course. This limitation makes it difficult to eliminate the residual OH groups surviving from the initial polyols. Accordingly, the resulting macromolecular material comprises protic functions which can accelerate the reduction of the esters and urethanes at the locus of the material of the negative electrode.

In order to eliminate these protic functions, it is possible to introduce an excess of the condensation agent to eliminate the OH groups. In the case of the polycondensates obtained according to the Specification in French Patent Publication No. 2 493 609, the elimination of the OH groups leads to a substantial reduction in molecular weight of the polymer and thus a degradation of mechanical properties. In the case of the crosslinking described in French Patent Publication No. 2 485 274, the use of the technique is attended by the risks of introducing an excess of a reagent which is unstable in redox reactions.

Further, it is noted that in the case of the crosslinking according to French Patent Publication No. 2 485 274 one obtains crosslinked resins without the possibility of obtaining a thermoplastic polymer. In the case of the polycondensates of French Patent Publication No. 2 493 609 one obtains linear chains which are not crosslinked.

A need exists therefore for a macromolecular material which displays ionic conduction, which is non-crystalline or sufficiently non-crystalline and which does not react with the metal of the anode of electrochemical generators.

SUMMARY OF THE INVENTION

Accordingly, one object of the present invention is to provide a macromolecular material displaying ionic conduction and which may be used as a solid electrolyte in an electrochemical generator.

It is another object of the present invention to provide a macromolecular material which is non-crystalline or sufficiently non-crystalline so that it may be employed in an electrochemical generator.

It is another object of the present invention to provide a macromolecular material which is stable under the redox environment of an electrochemical generator.

These objects and other objects of the present invention, which will become apparent from the following description, have been attained by providing a novel macromolecular material displaying ionic conduction which comprises a salt dissolved in an organometallic polymer. The organometallic polymer is comprised of an organic polymer in which a metal is directly connected by the intermediacy of an oxygen atom to at least two organic polymer chains. The organic polymer chains themselves are derived from one or more monomer moeities which may be different and which comprise at least one heteroatom capable of forming donor-acceptor type bonds with the cation of the salt in solution. The objectives have also been attained by providing a unique process for producing said organometallic polymer.

DETAILED DESCRIPTION OF THE PREFERRED EMBODIMENTS

According to the present invention a salt is dissolved into an organometallic polymer. The organometallic polymer can be linear, branched or crosslinked, as desired, and is stable under the redox environment of a salt electrolyte battery, such as a lithium battery. The organometallic polymer is based on metal bridging agents which are stable to the metal salt, usually lithium and which can be used in excess to cause the complete reaction of the reactive oxygen functionalities, e.g. OH, of the alcoholic starting materials from which the organometallic polymer is made. The organometallic polymer is obtained by the polycondensation of at least one polyol derived from one or more monomer moieties with a metal bridging agent. Each of the monomer moeities comprises at least one heteroatom capable of forming donor-acceptor type bonds with lithium cations in solution.

The polycondensation is carried out in the presence of a metal bridging agent having at least two carbon-metal bonds, in which the metal is chosen from the group comprising aluminum, zinc, and magnesium.

According to a first embodiment of the invention, the macromolecular material comprises a non-crosslinked organometallic polymer obtained by the polycondensation of a diol in the presence of a metal bridging agent having only two carbon-metal bonds.

According to a second embodiment of the invention, the macromolecular material comprises a crosslinked organometallic polymer obtained by the polycondensation of a diol in the presence of a metal bridging agent having three carbon-metal bonds.

According to a third embodiment, the macromolecular material comprises a crosslinked organometallic polymer obtained by the polycondensation of a polyol having at least three alcohol groups, in the presence of a metal bridging agent having two carbon-metal bonds.

The metal bridging agent is preferably chosen from alkyl metals and their derivatives, represented by one of the formulas:

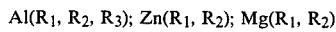

wherein $R_1$, $R_2$ and $R_3$ may be the same or different, and represent alkyl groups having 1 to 12 carbon atoms and which may be linear or branched, wherein $R_3$ may alternatively be a halogen such as chlorine, fluorine, or bromine, or a $C_1$-$C_{12}$ alkoxy group.

It is within the scope of the invention to employ metal bridging agents having more than three carbon-aluminum bonds. Thus, one may advantageously employ aluminooxanes which are products having four carbon-aluminum bonds.

The novel macromolecular materials of the present invention which display ionic conduction are useful in their application to the production of electrolytes for electrochemical generators.

In such applications, these macromolecular materials are free of most of the drawbacks of prior art embodiments. This is due to their structure which is brought about because the polycondensation reaction of the polymeric material (e.g., polyol or glycol) is carried out in the presence of metal bridging agents. These macromolecular materials include irregularities which correspond in particular to metallic alcoholate groups which confer on them a very low degree of crystallinity, rendering them practically amorphous at ambient temperature. There is a large temperature domain over which these materials will not crystallize but rather remain amorphous. Thus, one obtains a material in which the electrolyte salt is uniformly distributed, with all the conductivity advantages that this implies.

The organic polymer will now be described.

The polyol is preferably derived from a monomer moiety represented by the formula:

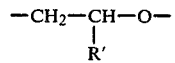

where $R'$ represents a hydrogen atom or one of the following groups: $R_a$; —CH$_2$—O—$R_a$; —CH$_2$—O—$R_e$—$R_a$; or —CH$_2$—N(CH$_3$)$_2$. Here $R_a$ is an alkyl or cycloalkyl group with generally 1 to 16 (and preferably 1 to 4) carbon atoms, and $R_e$ is a polyether group with general formula:

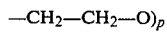

where p is an integer with a value from 1 to 100, and is generally 1 or 2.

According to another embodiment of the invention the polyol may be derived from a statistical or sequenced chain of monomers (I) of the formula supra copolymerized with moieties represented by the following formula:

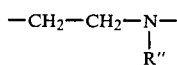

where $R''$ represents $R_a$ or —$R_e$—$R_a$, with $R_a$ and $R_e$ defined as above; or the polyol is derived from monomers (I) and moieties

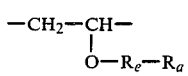

with $R_a$ and $R_e$ defined as above; or the polyol is derived from monomers (I) and moieties

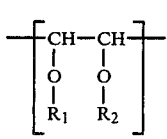

wherein $R_1$ and $R_2$ may be identical or different, representing $R_e$, $R_c$, $R_c$—$R_a$ or —$R_e$—$R_a$ as defined above. In (IV) supra $R_c$ may represent a polyether of formula:

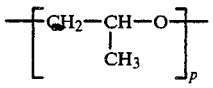

Preferably the polyols employed are polyglycols having in particular a weight average molecular weight between 300 and 20,000.

Polyoxyethylene glycols having a molecular weight range of from 1000 to 4000 may be used. Polyoxyethylene glycols having a molecular weight range of 1000 to 2000 and 2000 to 4000 are useful. For example, polyoxyethylene glycols having a molecular weight range of about 1500 or about 3000 can be used. Polyglycols having a formula H(OEt—OPr—OEt)$_x$OH, where Et is ethyl and Pr is propyl, and having a molecular weight of from about 4000 to 6000 are useful. A molecular weight of about 5000 is particularly useful for these latter polyglycols.

According to other embodiments, the polyols may be branched and/or may comprise identical recurrent chains or nonrecurrent sequences. The nonrecurrent chains may be built up statistically or in sequenced fashion.

The starting material may be, e.g., a linear alpha-omega-diol, a branched diol, or a triol.

As will be seen infra, the choice of the polyols used will depend on their characteristics governing the value of the ionic conductivity, the mechanical resistance (strength and durability), and the behavior of the conductivity as a function of temperature.

Thus it can be seen that the present invention enables the production of non-crosslinked structures starting with ethylene glycol and employing a metal dialkyl compound as the metal bridging agent. It also enables the production of crosslinked structures by employing either a glycol and trialkylaluminum or else a polyol and a dialkyl metallic bridging compound or a trialkylaluminum compound.

More generally, the invention relates to a macromolecular material displaying ionic conduction and comprised of a salt in solution in an organometallic polymer. The macromolecular material is characterized in that it comprises an organometallic polymer in which each metal atom is directly connected by the intermediacy of an oxygen atom to at least two polymer chains, each derived from one or more monomers comprising at least one heteroatom capable of forming donor-acceptor bonds with the cation of the salt in solution.

Preferably the metal in the organometallic polymer is chosen from the group comprising aluminum, zinc, and magnesium.

The use of metal bridging of this type which comprise at least two metal-carbon bonds avoids the drawbacks of the prior art since these agents are stable in the redox environment found in lithium batteries and may be introduced in excess so as to eliminate OH functions from the polymers. The high activity of the metal bridging agents used according to the invention enables all the residual alcoholic functions to be eliminated with only a slight excess of the metal bridging agent. Thus one can obtain a macromolecular material of high molecular weight to the same extent as in the case of non-crosslinked polycondensates. Further, at the end of the polycondensation, the elimination of residual OH functions can be ensured by adding a stoichiometry excess of the metal bridging agent in the amount of 15 to 20%.

The salts dissolved in the macromolecular material are advantageously lithium salts or mixtures of different lithium salts. These salts may may be used in quantities sufficient to provide O/Li ratios (as described in European Patent Publication No. 0 013 199 (U.S. Pat. No. 4,303,748)) of from 5:1 to 20:1. The salts may be similar to those described in European Patent Publication No. 0 013 199, or one may choose bis(perhalogenoalkyl) or sulfonyl imides such as are described in French Patent Application No. 82 09 540 filed June 1, 1982 (U.S. application Ser. No. 500,193, filed June 1, 1983; now U.S. Pat. No. 4,405,997), or tetralkynylborates or aluminates such as described in French Patent Application No. 82 09 539, or tetrakistrialkylsiloxy alanates of alkali metals such as described in French Patent Application No. 82 09 538 (U.S. application Ser. No. 500,191, filed June 1, 1983).

One may also employ cloroboranes such as are disclosed in French Patent Application No. 82 04 623 (corresponding to PCT application PCT/FR/8300076) filed Mar. 18, 1982.

To manufacture the macromolecular materials of the present invention, the polyol and the salt are mixed, in the presence of a solvent, if desired if the polyol itself is not liquid at the temperature of the reaction, and e.g., the alkylaluminum is added to the mixture. A polycondensate is obtained, which is crosslinked or non-crosslinked.

Alternatively, the salt may be dissolved in the organometalic polymer after the polycondensation, either by means of a solvent or by fusion techniques if the macromolecular material happens to be thermoplastic.

The crosslinked polycondensates may be produced by passing through a pre-condensation stage wherein a certain amount of the diol is reacted with a stoichiometric excess of the alkylmetallic compound to yield a polymer of low mass having an alkylmetal at its two ends. This is shown in the following process where an alkylaluminum is used as an example:

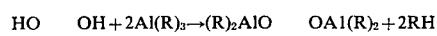

$$HO\quad OH + 2Al(R)_3 \rightarrow (R)_2AlO \quad OAl(R)_2 + 2RH$$

This polymer will then act as a pre-condensate, where, in a second stage, the remaining amount of the polyol is added to obtain the final polycondensate.

The advantage of such a two-stage polycondensation with the first stage a pre-condensation stage lies in the fact that this first stage enables the heat liberated to be removed easily, since the materials employed are low in molecular mass and thus have low viscosity. Another advantage is connected with the fact that the more volatile and lightweight RH radicals are eliminated from the reaction medium, whereby the final reaction can be carried out under homogeneous conditions compatible with the viscous medium.

When the present macromolecular material displaying ionic conduction is used in a battery, not only does it supply an electrolyte but it can also can be employed to produce composite electrodes, i.e. electrodes in which the active material is mixed with the electrolyte. The active material mixed with the electrolyte can also be mixed with a material displaying electronic conduction.

In manufacturing the positive electrode of a battery, one may incorporate the active material, e.g. $TiS_2$ or $V_6O_{13}$, in the initial mixture. This mixture thus will be comprised of the polyol, the salt, the active material and the solvent. The condensing agent is then added thereto. If the macromolecular material is a non-crosslinked polycondensate, techniques not employing a solvent may be used, e.g. fusion following grinding and possibly compacting.

In manufacturing a negative electrode based on lithium, the necessary precautions should be taken to ensure that the lithium cannot react with the OH bond of the polyol. A non-crosslinked macromolecular material can be used and the lithium can be incorporated by means of a solvent after completion of the polycondensation reaction.

Other features of the invention will become apparent in the course of the following description of exemplary embodiments which are given for illustration of the invention and are not intended to be limiting thereof.

In these examples, the definition of the ratio O/Li is the same as in European Patent Application No. 0 013 199.

EXAMPLE 1

Production of a solid electrolyte beginning with polyoxyethylene glycol

Polyoxyethylene glycol of molecular weight 1500 and lithium perchlorate are dissolved in a mixture of acetonitrile and dichloromethane. The composition by weight of the resulting mixture is as follows: POEG 1500, 51.0%; LiClO$_4$, 11.8%; acetonitrile, 27.7%; dichloromethane, 8.6%. 26 g of this solution (which solution has a dry residue amounting to 60% by wt.) with an O/Li ratio of 12.5:1 is mixed under agitation with 6 ml of trioctylaluminum (TOA) (an excess of the latter of about 15% of stoichiometric), at 5° C. The product obtained is spread out over a plane polyethylene surface with the aid of a clearance edge set at 400 micron. A humid film results which crosslinks after being heated at 25° C. for less than 2 hrs. After drying, the film is removed from its support and introduced into a conductivity measurement cell, to measure the temperatures at which the conductivity is equal to $10^{-5}$ ohm$^{-1}$/cm ($t\sigma 10^{-5}$) and $10^{-4}$ ohm$^{-1}$/cm ($t\sigma 10^{-4}$).

$t\sigma 10^{-4} = 52°$ C.

$t\sigma 10^{-5} = 22°$ C.

Comparison Example

A similar electrolyte has been produced from the same polyol (POEG 1500) but using an aliphatic triisocyanate sold under the name Desmodur N (Bayer), as the crosslinking agent. For the same O/Li ratio, the following results are obtained:

$t\sigma 10^{-4} = 90°$ C.

$t\sigma 10^{-5} = 54°$ C.

Thus it is seen that the invention enables a thin amorphous film to be produced which has a low-temperature ionic conductivity which is much better than found in the prior art.

EXAMPLE 2

The same operations are carried out as in Example 1, but the lithium perchlorate is replaced by lithium trifluoromethanesulfonate, with the O/Li ratio of the final macromolecular solution product equal to 12:1, using the same parameters as in Example 1. The results of the conductivity measurements are reported in Table I infra, the data in the first column being for an inventive material derived from polyoxyethylene glycol condensed in the presence of trioctylaluminum. In the second column conductive measurements for a material according to the present invention obtained by using an aromatic tri-isocyanate sold under the name Desmodur R are reported.

TABLE I

|  | POEG 1500 + TOA | POEG 1500 + DESMODUR R |
|---|---|---|
| t σ 10$^{-4}$ ohm$^{-1}$/cm | 60° C. | 132° C. |
| t σ 10$^{-5}$ ohm$^{-1}$/cm | 24° C. | >170° C. |

In examining this Table it is seen that essentially the same results are obtained for the inventive materials when the salt is a perchlorate (example 1) as when it is a trifluoromethanesulfonate (this example). It is also seen that the results are much better with the trialkylaluminumn than with the aromatic triisocyanate.

EXAMPLE 3

This example relates to a material similar to that of Example 1 except that the glycol used is a polyoxyethylene glycol with molecular weight 3000.

First, the following mixture is produced (percentages in wt.%): POEG 3000, 48%; lithium perchlorate, 9.6%; acrylonitrile, 38.5%; dichloromethane, 3.85%. Trioctylaluminum in 15% excess over stoichiometric is added to this solution, which solution has a O/Li ratio of 12.5:1. The dry residue of the resulting mixture is about 75%. The reticulation is carried out over at least 2 hr. The conductivity measurements yield the following:

$t\sigma 10^{-4} = 46°$ C.

$t\sigma 10^{-5} = 26°$ C.

EXAMPLE 4

This example relates to a material similar to that of Example 3 except that the preparation is carried out using a pre-condensation stage wherewith only ⅓ of the starting solution is mixed with trioctylaluminum. The conductivity measurements yield the following:

$t\sigma 10^{-4} = 55.0°$ C.

$t\sigma 10^{-5} = 29.3°$ C.

It is seen that the results with a pre-polymerization stage are excellent. At the same time, the process is facilitated, particularly as regards ease of thorough mixing. If with the same procedure trihexylaluminum is used in place of the trioctylaluminum, still retaining the precondensation stage, essentially the same results are obtained:

$t\sigma 10^{-4} = 49.5°$ C.

$t\sigma 10^{-5} = 25.0°$ C.

Using the same procedure except that a triisocyanate (see "Comparison Example" and Example 2, supra) is used for bridging, the results are:

TABLE II

|  | DESMODUR N | DESMODUR R |
|---|---|---|
| t σ 10$^{-4}$ ohm$^{-1}$/cm | 87° C. | 120° C. |
| t σ 10$^{-5}$ ohm$^{-1}$/cm | 48° C. | 67° C. |

EXAMPLE 5

This example relates to a macromolecular material prepared from the three-unit oligomer H(OEt—O—Pr—OEt)OH, noted infra, where Et is the ethylene group and Pr is the propylene group. The preparation process employed is similar to that of Example 1 (no pre-condensation phase). Two variants were prepared, one with a diol of molecular weight 5000, and one with a diol of molecular weight 8500. Trioctylaluminum, in excess, was used as the condensing agent.

The conductivity results obtained were compared with those for the same process but using the isocyanates Desmodur N and Desmodur R, respectively (Table III). The headings in Table III give the cross-linking agent used to condense the glycol, and the molecular weight of the polymer produced by the condensation.

TABLE II

|  | TOA, 5000 | TOA, 8500 | DESMODUR N, 8500 | DESMODUR R, 5000 | DESMODUR R, 8500 |
|---|---|---|---|---|---|
| t σ $10^{-4}$ ohm$^{-1}$/cm | 70 | 74 | 120 | 109 | 105 |
| t σ $10^{-5}$ ohm$^{-1}$/cm | 35 | 40 | 65 | 63 | 59 |

EXAMPLE 6

Production of an electrochemical battery

The following cell is established
1. Electrolyte—a polycondensate, obtained by directly condensing polyoxyethylene glycol of molecular weight 3000, with a trioctylaluminum in which lithium perchlorate is dissolved such that the ratio O/Li is 12:1.
2. Positive electrode—a composite electrode comprised of a macromolecular material displaying electronic conduction.
It includes:
A material displaying ionic conduction—a copolymer of ethylene oxide (90 mol%) and methyl glycidyl ether (8 mol%), in which copolymer lithium perchlorate is dissolved (ratio O/Li is 12:1).
Active material—molybdenum dioxide.
Electronic conductor—carbon black.
Composition of the electrode (in vol%): Ionic conduction material, 50%; active material, 40%; electronic conductor, 10%.
3. Negative electrode—a strip of lithium.

The cell is 150 micron thick and has surface area 4 sq.cm. It is disposed in a casing comprised of stainless steel.

A first discharge is carried at 30° C., at a rate of C/30, i.e. at a rate such that the entire discharge capacity is consumed in 30 hr. The current under these conditions is 50 uA. "Utilization" in this discharge is 32%, i.e. 32% of the total capacity of the cell is recovered. If the temperature is increased, "utilization" increases as well. At 40° C., "utilization" is 40%.

Under the same conditions, with an electrolyte of the prior art urethane type comprised of lithium perchlorate dissolved in polyoxyethylene glycol, "utilization" in the initial charging and discharging is not over 6%.

EXAMPLE 7

Production of an electrochemical battery wherein the electrolyte is a polycondensate obtained by condensing a polyoxyethylene glycol of molecular weight 3000 with trioctylaluminum The cell produced is identical to that of Example 6. The cell is cycled (i.e., charged and then discharged) at 30° C., at a rate of C/100 (defined supra). The "utilization" fraction stabilizes at around 15%, at about the sixth cycle repetition.

This cell according to the present invention is compared with a urethane-type cell according to the prior art, employing the same macromolecular constituent polymer and the same electrodes, except for the substitution of the triisocyanate for the trialkylaluminum. The "utilization" fractions obtained for the first two cycles, on charging (C) and discharging (D) are indicated in Table IV.

TABLE IV

| | POEG 3000, TOA | | POEG 3000, DESMODUR N | |
|---|---|---|---|---|
| Cycle | D | C | D | O |
| 1 | 36% | 30% | 6% | 15% |
| 2 | 26% | 28% | 8% | 16% |

It is seen that inventive cells have high "utilization" fractions for the initial charging/discharging cycles. This is readily attributable to the fact that the inventive macromolecular materials are free of protic functions and unstable reactants.

In addition, as is seen from the Examples, the material obtained has excellent operational characteristics at ambient temperature.

The invention is not confined to the Examples described, but encompasses all variants of these.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A macromolecular material displaying ionic conduction comprising a salt dissolved in an organometallic polymer, wherein the organometallic polymer comprises an organic polymer in which a metal is directly connected by the intermediacy of an oxygen atom to at least two organic polymer chains; wherein the organic polymer chains comprise at least one monomer containing at least one heteroatom capable of forming a donor-acceptor bond with the cation of the salt.

2. The macromolecular material of claim 1, characterized in that the metal is chosen from the group consisting of aluminum, zinc, and magnesium.

3. The macromolecular material of claim 1 wherein the organic polymer comprises a monomer moiety of the formula

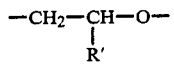

wherein $R^1$ is hydrogen, $R_a$, —$CH_2$—O—$R_e$—$R_a$ or —$CH_2$—N(CH$_3$)$_2$, wherein $R_a$ is a $C_{1-16}$ alkyl or a $C_{1-16}$ cycloalkyl, and $R_e$ is a polyether group of the following formula

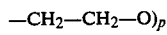

wherein p is an integer with a value from 1 to 100.

4. The macromolecular material of claim 3 wherein the organic polymeric further comprises a monomer moiety of the formula

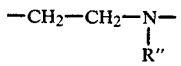

wherein R″ is $R_a$ or —$R_e$—$R_a$.

5. The macromolecular material of claim 3 wherein the organic polymer further comprises a monomer moiety of the formula

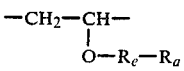

6. The macromolecular material of claim 3 wherein the organic polymer further comprises a monomer moiety of the formula

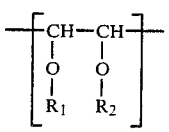

wherein $R_1$ and $R_2$ are independently Re, $R_c$, —$R_c$—$R_a$ or —Re—Ra, and wherein $R_c$ may be a group of the following formula

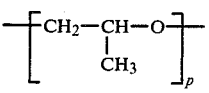

7. The macromolecular material of claim 1 characterized in that the organometallic polymer is a non-crosslinked polycondensate obtained by polycondensation in the presence of a metal bridging agent having only two carbon-metal bonds.

8. The macromolecular material of claim 1 characterized in that the organometallic polymer is a crosslinked polycondensate obtained by polycondensation in the presence of a metal bridging agent having three carbon-metal bonds.

9. The macromolecular material of claim 1 characterized in that the organometallic polymer is a crosslinked polycondensate obtained by polycondensation of a polyol having a branched structure in the presence of a metal bridging agent having two carbon-metal bonds.

10. The macromolecular material of claim 1 characterized in that the organic polymer is obtained by the polycondensation of a polyol with a molecular weight of between 300 and 20,000.

11. The macromolecular material of claim 1 characterized in that the organometallic polymer is an aluminum polyoxyethylene glycolate derived from a polyoxyethylene glycol of a molecular weight of from about 1000 to 2000.

12. The macromolecular material of claim 1 characterized in that the organometallic polymer is an aluminum polyoxyethylene glycolate derived from a polyoxyethylene glycol of a molecular weight of from about 2000 to 4000.

13. The macromolecular material of claim 1 characterized in that the organometallic polymer is an aluminum glycolate with the anion having the formula (OEt—OPr—OEt)$_x$O$^{-2}$ and being derived from a polyglycol having a formula H(OEt—OPr—OEt)$_x$OH and having a molecular weight of from about 4000 to 6000.

14. The macromolecular material of claim 1 characterized in that the organometallic polymer is an aluminum glycolate with the anion having the the formula (OEt—OPr—OEt)$_x$O$^{-2}$ and derived from a polyglycol having a formula H(OEt—OPr—OEt)$_x$OH and having a molecular weight of from about 7500 to 9500.

15. The macromolecular material of claim 1 characterized in that the organometallic polymer is a polycondensate obtained by polycondensation in the presence of an aluminum compound having four carbon-aluminum bonds.

16. The macromolecular material of claim 13 wherein the salt is at least one lithium salt.

17. The macromolecular material of claim 16 wherein the lithium salt is used in an amount sufficient to give a O/Li ratio from about 5:1 to 20:1.

18. A macromolecular material displaying ionic conduction, comprising a salt dissolved in an organometallic polymer, wherein the organometallic polymer comprises an organic polymer in which a metal is directly connected by the intermediacy of an oxygen atom to at least two of the organic polymer chains; wherein the organic polymer comprises at least one monomer containing at least one heteroatom capable of forming a donor-acceptor type bond with the cation of the salt; and wherein the metal bridging agent has at least two carbon-metal bonds, with the metal being chosen from the group consisting of aluminum, zinc, and magnesium.

* * * * *